United States Patent [19]

Hepler

[11] Patent Number: 5,589,206
[45] Date of Patent: Dec. 31, 1996

[54] COMPACT DISC INJECTION MOLDING APPARATUS

[75] Inventor: Douglas C. Hepler, Rochester, N.Y.

[73] Assignee: Polyshot Corporation, Henrietta, N.Y.

[21] Appl. No.: 278,935

[22] Filed: Jul. 22, 1994

[51] Int. Cl.⁶ ................................................ B29C 45/20
[52] U.S. Cl. ........................................ 425/549; 425/810
[58] Field of Search ................................. 425/549, 810

[56] References Cited

U.S. PATENT DOCUMENTS

| | | | |
|---|---|---|---|
| 4,034,952 | 7/1977 | Stewart | 425/572 |
| 4,266,723 | 5/1981 | Osanu-Diaz | 425/549 |
| 4,273,525 | 6/1981 | Reitan | 425/549 |
| 4,309,163 | 1/1982 | Cottancin | 425/549 |
| 4,563,149 | 1/1986 | Landis | 425/549 |
| 4,593,182 | 6/1986 | Schwarzkoff | 425/549 |
| 4,666,396 | 5/1987 | Shaw | 425/549 |
| 4,882,469 | 11/1989 | Trakas | 425/549 |
| 4,961,884 | 10/1990 | Watanabe et al. | 425/810 |
| 5,092,758 | 3/1992 | Tanaka et al. | 425/810 |
| 5,232,710 | 8/1993 | Miyazawa et al. | 425/549 |
| 5,234,336 | 8/1993 | Hosokawa et al. | 425/549 |
| 5,330,693 | 7/1994 | Takada | 425/810 |
| 5,334,006 | 8/1994 | Hepler et al. | 425/549 |

*Primary Examiner*—Tim Heitbrink
*Attorney, Agent, or Firm*—Francis J. Caufield

[57] ABSTRACT

A highly reliable molding architecture which includes a two-zoned hot sprue bushing with an interchangeable tip for use in controlling the temperature of plasticized material while it flows from the injection nozzle to the gates of a cavity mold for fabricating flat, thin objects such as compact discs and the like. Advantageously, the hot sprue bushing is adjustable in length so that it can be used with a full range of standard or custom mold plate thicknesses or other required lengths, and the interchangeable tip does not require separate heating and temperature control. With the system and its hot sprue delivery system, compact disc defect levels and scrap losses are reduced.

11 Claims, 7 Drawing Sheets

COMPACT DISC INJECTION MOLDING APPARATUS

BACKGROUND OF THE INVENTION

1. Field of the Invention

This invention relates generally to compact disc injection molding apparatus and more particularly to hot sprue bushings for use in molding compact discs.

2. Description of the Prior Art

Compact discs, which were first developed by Philips and Sony in the early 1980's, are now a well-established form of medium for recording a variety of retrievable information. Their popularity and success stem from their compactness, convenience, competitive cost, and high information storing capacity.

Physically, such discs are thin, flat, circular objects approximately 120 mm in diameter by about 1.2 mm thick. They are provided with a central hole about 15 mm in diameter for purposes of mounting them for rotation in various devices capable of reading and writing information to and from them. Typically, audio, video or other data is recorded in digital form on one surface of the disc with the opposite remaining free for carrying information about the contents of the recorded information.

For enabling writing and recording information, a compact disc (CD) comprises a clear plastic layer over a thin reflective aluminum surface several micrometers thick. Data, which may be any of a variety of types, is stored on the disc in binary code; the 'zeros' of the code being dents or pits in the plastic surface while the 'ones' are represented by smooth plastic. When playing the disc, a laser beam scans the disc surface as it rotates and is reflected back only by the 'one' areas. Reflected light pulses are picked up by a photodetector which converts them into a digital electrical signal that can then be further processed for subsequent use in various playback devices appropriate for the type of information recorded in the disc.

While very popular for audio recording, CDs also can be used for storing video information, which applies the same technology. These have advantages over magnetic tape by virtue of being easier to replicate and randomly access.

CDs are also used to store large amounts of computer information. Here, CD-ROM (compact disc with read-only memory) is the most common format, but other forms of disc are available that allow data to be written on the disc as well as read.

Recent applications for CD use include the photo-CD, which records still images for viewing on a television screen or reproduction as hard copy, and the multimedia CD, which holds pictures, sound, and text on one disc and can play them back through television receiver and hi-fi equipment or appropriately configured computer systems.

While CDs are physically robust, they require great care in their fabrication to provide their necessary physical attributes and the proper encoding of recorded information. Moreover, all of this must be done in a highly competitive environment where large product volumes are routine.

Current fabrication depend on the use of high volume injection molding systems and related coating equipment for forming the reflective aluminum surface. However, the molding equipment in known use employs cold sprue systems or bushings which lead to undesirable material losses and high defect levels, especially birefringence and black and white spots, all of which would lead to intolerable reading errors.

In view of the known art, there continues to be a demonstrable need for more effective ways of providing significantly improved compact discs having fewer manufacturing defects and thus higher yields. And, it is a primary object of this invention to fulfill this need.

Another object of the present invention is to provide injection molding arrangements by which compact discs can be molded with hot sprue bushings to reduce material losses and defect levels, the viewable surfaces of flat containers may be exploited to provide views of different information by observing those surfaces from slightly different perspectives.

Yet another object of the present invention is to provide optical arrangements by which encoded information may be provided on a viewable surface.

Yet another object of the present invention is to provide optical viewing arrangements for compact disc containers that can be implemented by relatively minor modification of currently existing molds for fabricating them.

Still another object of the present invention is to provide optical arrangements by which pseudo-dynamic information may be provided to an observer of a flat container box.

Other objects of the invention will be apparent and will appear hereinafter in the following detailed description when read in connection with the drawings.

SUMMARY OF THE INVENTION

This invention relates generally to injection molding machinery and particularly to a highly reliable molding architecture which includes a hot sprue bushing system for controlling the temperature of plasticized material as it is conveyed through the stationary plate or plates of a mold from the nozzle to the cavity gate for a compact disc. The hot sprue bushing system may be adjusted in drop length as necessary, and preferably includes two zones of thermal control. The bushing in preferred form comprises a one-piece body of corrosion-resistant steel hardened to provide enhanced wear characteristics. Through the length of the body is an elongated, bore that terminates in a specially configured tip near its exit end for conveying the plasticized material. Surrounding the through bore are a plurality, preferably four, equally spaced electrical heating cartridges for maintaining its length under controlled temperature conditions. The specially configured tip receives heat from the heating cartridges and gradually tapers in temperature from that maintained in the through bore to a temperature at the mold gate that is optimized for assuring highest quality compact discs. Temperature is monitored by a thermocouple located near the bushing tip at a location near the junction of the end of the through bore and the beginning of the tip.

The body has a threaded head near the nozzle end for receiving a series of spacing sleeves or collars adapted to permit adjustment of the effective bushing length to match either standard mold plate thicknesses or custom length requirements.

A removable cap of high heat conductivity mates with the body head to assure temperature control of nearby regions not directly heated by the cartridges. Additionally, the cap, which is preferably fabricated of stainless steel, provides the interface with the nozzle. For this purpose it has a recess whose geometry is shaped to complement that of standard nozzles. In addition, the cap is preferably surrounded by a band heater under separate zone control to provide more precise control of the plastic as it is delivered from the plasticizer unit to the CD mold cavity.

At the nozzle end over the cap is a stainless steel bracket for holding and positioning wiring to ease handling and keep wiring clear of other molding equipment.

DESCRIPTION OF THE DRAWINGS

The structure and operation of the invention, together with other objects and advantages thereof, may best be understood by reading the detailed description in connection with the drawings in which unique reference numerals have been used throughout for each part and wherein.

BACKGROUND

Figure 1:
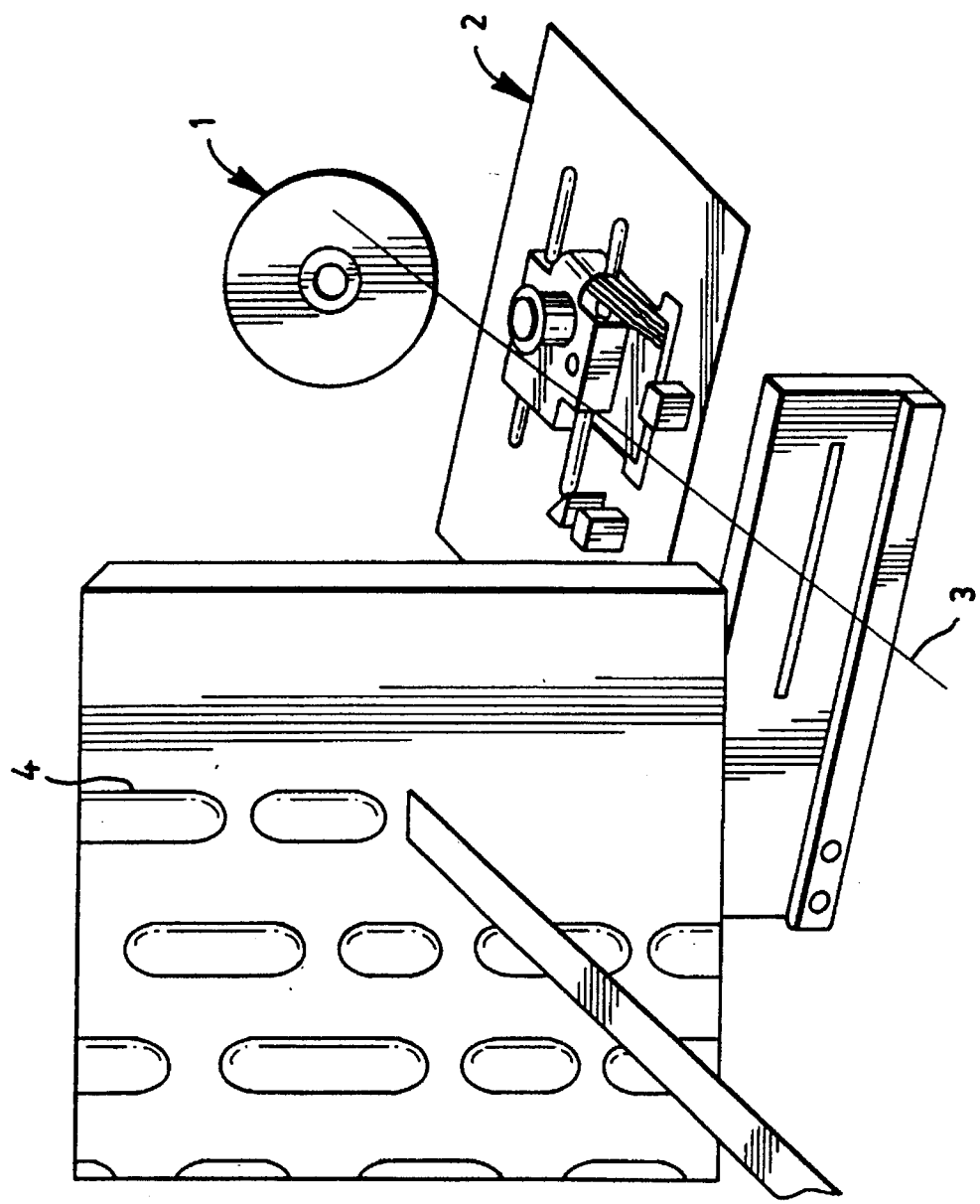
FIG. 1 is a diagrammatic perspective view illustrating a compact disc in combination with a read head for decoding information from the compact disc and an exploded view of a segment of the compact disc with an incident laser beam.
Figure 2:
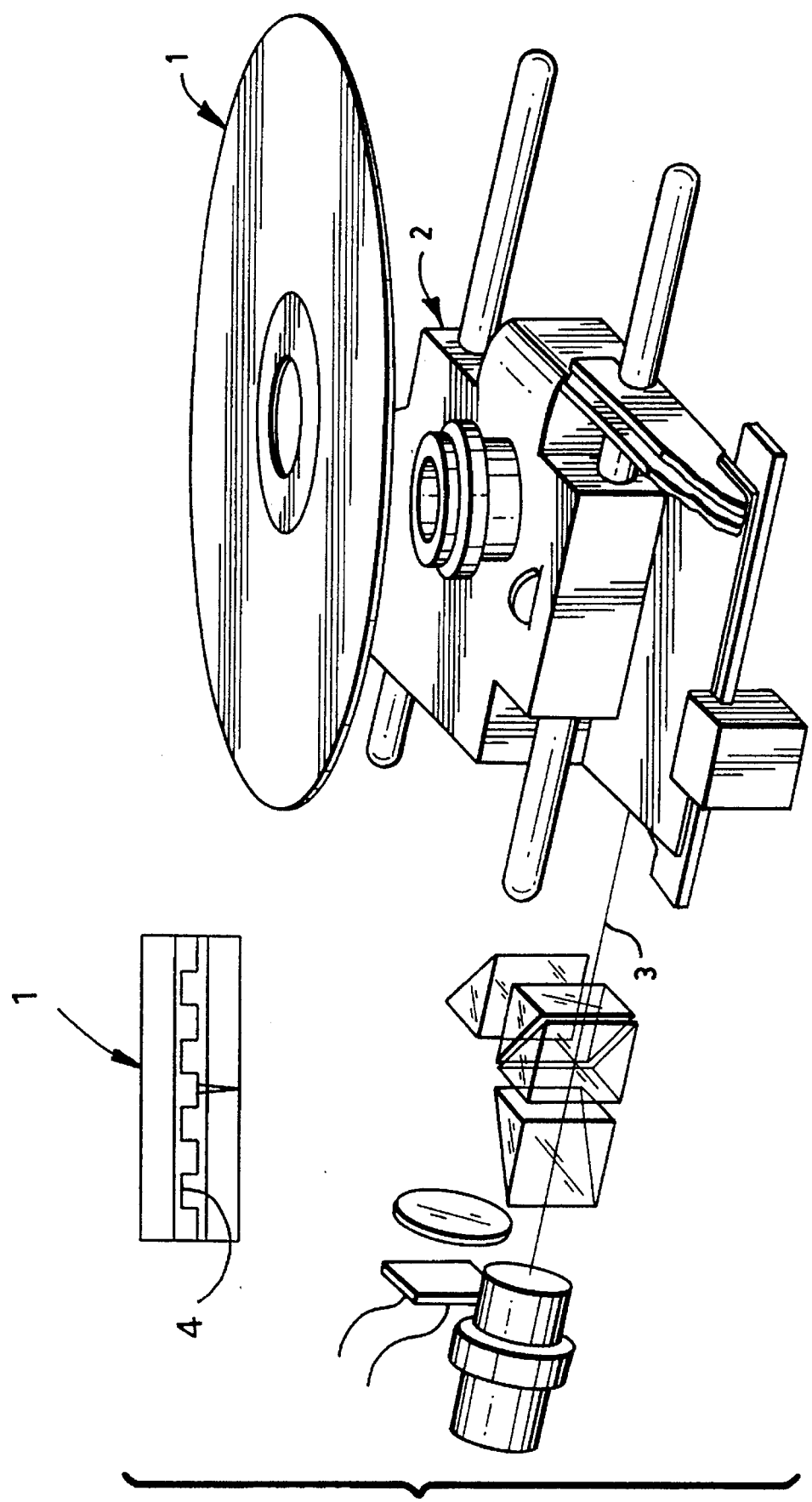
FIG. 2 is a diagrammatic perspective view of a conventional optical head for scanning and reading a CD along with a cross-sectional elevational view of the CD showing its layered structure along with illustrative pits.

FIGS. 1 and 2 show a compact disc 1 in combination with an optical system 2 for generating a scanning laser beam 3 that is used to illuminate microscopic pits 4 (enlargement in FIG. 1) which carry information. Light reflected from the surface of disc 1 is more or less intense depending on whether it encounters a pit or not. By careful arrangement of the pits, the information is encoded and read back in digital form.

As shown in the inset to FIG. 2, the cross-sectional structure of a compact disc comprises a transparent molded polycarbonate layer in which the pits 4 are formed during injection molding, a reflective metal layer over the surface of the disc which carries the pits, and a protective layer over the metal layer, which also carries the label and other information.

The process for injection molding the polycarbonate substrate with pits 4 begins with a master tape which is processed for fidelity and formatting. In the most common procedure, the master tape is used to modulate the exposure of a photoresist carried on glass substrate, which is developed and then deposited with a metal. Afterwards, an electroforming process is utilized to make a metal stamper for placement in one face of an injection molding cavity.

Following the mastering and electroforming processes, discs may be replicated at will until there is some intolerable degradation in the process or stamper. Injection molding techniques are commonly used for the replication process, which is then followed by evaporation coating to deposit the reflecting metal layer and then by the formation of the protective coating which may be by spin coating.

In the molding process, molten plastic is injected into a mold cavity, with the stamper on one face producing a clear plastic disc with the pits impressed on one side. A special grade of compact disc polycarbonate plastic is used chiefly for its high transparency, dimensional stability, ability to accurately reproduce the mold surface, minimum water absorption, good impact resistance, easy processing characteristics, and freedom from impurities. These characteristics can be achieved from a high-grade polycarbonate resin. However, polycarbonate material has certain inferior specifications, especially when handled by injection molding; and these characteristics require special care which, if not properly dealt with, can result in defective product and attendant low yields or high scrape losses.

As is well-known, the molding of compact discs presents great challenges; the disc must be flat and optically pure, and it must retain an accurate impression of the data pits. Furthermore, typical molding practices can result in discs with deficient optical properties, such as unacceptable levels of birefringence leading to fidelity issues. To achieve satisfactory results, disc molding requires minimized plastic resin viscosity for good fluidity. To obtain low viscosity, good fluidity and hence acceptable optical properties the resin temperature must be raised considerably. However, if the temperatures are excessive, the resin may easily decompose, resulting in color change or bubbles. Because the disc volume is small and the amount of resin needed is small, heated resin retained in typical molding machines can easily be degraded or burned. Furthermore, high-speed passing of resin causes mechanical shearing heat, which is another factor to be controlled.

Although problematic, high-speed filling is desirable in injection molding. High-speed filling prevents a drop in temperature of the polycarbonate and enables uniform melting temperature in the cavity. This ensures uniform force and density of the molded disc and makes possible uniform cooling speed across the entire disc surface, which in turn allows uniform shrinkage. High-speed filling also prevents pressure drop and assures that adequate pressure is applied even at the far edges of the cavity. Distribution of the pressure in the cavity is uniform, and molding shrinkage is small. Molding can be performed with lower pressure, resulting in discs with minimum warpage or deformation. Finally, high-speed filling permits molding at lower temperature and faster cycle times.

As cavity filling speed is increased, however, two problems arise. First, it is difficult to accurately control the amount of polycarbonate to be injected. Second, it is difficult to discharge air from inside the cavity. Sophisticated control systems and, in some cases, a vacuum in the cavity can be used to achieve very brief filling periods of 0.01 to 0.1 seconds at low pressure.

Because of these and other problems, use of typical injection molding machines results in discs with burned plastic, and consequently, contaminations or bubbles. If the resin temperature is lowered, strain or deformation of the disc after molding can result, along with a high birefringence. After experimentation with various polycarbonate resins, different kinds of injection molding machine designs, mold shapes, techniques for producing a single-piece polycarbonate disc were achieved. As a result, there is a considerate difference between standard polycarbonate and that used for making CDs in specification such as melt flow rate.

Because polycarbonate is a hygroscopic material, care must be taken in the plasticizing unit to keep it moisture free. It must be dried, stored at a high temperature, and then used without being exposed to ambient air. Thus, pellets of polycarbonate (cleaned and dried) are drawn directly through the hopper and into a heating barrel; a screw moves the pellets through a series of heating coils to heat the plastic quickly and uniformly to a high temperature (approximately 350 degrees centigrade) in order to achieve smooth flow properties into the mold cavity during injection. When the molten plastic is injected into the mold cavity at high pressure, it conforms to the stamper's contours, producing a substrate disc with pits. The mold is kept at a temperature of approximately 100 degrees centigrade.

Some systems use an injection-compression molding process. The molten plastic is first injected into the mold, which is not yet completely closed. The final shape of the disc is accomplished during the subsequent compression step. With injection-compression molding, molded-in stress is minimized, but cycle times are somewhat longer than conventional injection molding, perhaps 10 seconds as compared to 5 seconds.

In most cases, the center hole is formed before the disc is removed from the mold. In other systems, the center hole is punched out of the disc separately, after the top layer is applied but before the label is printed. Following molding, the warm disc is subject to static charge; any dust particles in the air are attracted to the disc. The molding room must be kept at Class 1,000, and special hoods are placed over the molding machines for an even cleaner environment at the molding head.

In summary, the injection molding process requires consideration of environmental cleanliness and temperature control, nozzle and hopper temperature regulation, mold temperature regulation, adjustment and stability of injection volume and time, removal of flashes from mold surface, and the quality of stampers.

It is common current practice in the industry to use cold sprue bushings to deliver the plastic from the plasticizer to the mold cavity. This practice, while satisfactory, is less than optimal for a variety of reasons. Among them include the high waste associated with the cold sprue, additional handling steps, and the introduction of a variety of optical defects because of the thermal differences in the delivery path from beginning to end.

One major defect of concern is birefringence, a difference in index of refraction along different azimuths in the transparent polycarbonate substrate. It is a form of optical distortion that can be introduced during injection molding of the substrate. Birefringence is an optical measure of material stress, which is related to the difference in the index of refraction in materials through which light passes. These affect the phase relationship of laser light and can result in reading errors. The amount of birefringence in a plastic material is related to its inherent optical properties but, more importantly, to the internal stress in the plastic caused, in this case, by shrinkage, flow lines, inclusions, and shear experience in the delivery path. Injection molding therefore greatly increases the amount of birefringence in polycarbonate.

Due to refraction, light rays bend as they pass from one medium to another with a different density. With birefringence (a kind of double refraction) light is refracted into two images. In refraction, light slows down as it enters a new medium. With birefringence, light is slowed down at two different rates, depending on the angle at which it passes through the material. More specifically, the light is split into two perpendicular polarized components with different refraction and different wavelengths. Birefringence causes a reduction in the intensity of laser light that is read from the disc by the pickup (FIG. 2). This reduction in intensity is caused by the turning of the polarization direction away from that of a polarizer in the optical path to the detector. Because the polarization direction is not aligned with the polarizer, less light is allowed back into the pickup. The effect is similar to the way polarized sunglasses reduce glare; however, in the case of CD production, the effect is unwelcome.

Birefringence also changes the critical phasing of the light as it reflects off the disc. The area of the laser spot simultaneously striking a pit relative to the surrounding land, and the carefully calculated pit depth causes destructive interference. This yields intensity modulation of the reflected light. Since birefringence causes deteriorated interference, the quality of the modulated light is degraded. In either case, birefringence causes reduced signal response from the optical pickup. This can cause data reading errors, as well as tracking problems, in all CD players with laser pickups which use a polarized, beamsplitting head to read polarized light as it passes through the disc. Pickups using holographic optical elements (HEM) technology are not affected by birefringence.

The wavelength of a pickup's laser light is 780 nanometers in air and approximately 500 nanometers in polycarbonate (the index of refraction is 1.55). Birefringence is measured in terms of the phase shift between the x and y components of light and is expressed in nanometers. It is measured by finding the amount of reduction of polarized light intensity through the disc. The birefringence specification calls for a maximum deviation of 20 percent (100 nanometers) from the 500 nanometer wavelength. In any event, when birefringence of a disc exceeds a normal amount, there is increased risk that not all players will play the disc.

The first-generation methods of injection molding of polycarbonate were inefficient in several respects. Polycarbonate was difficult to mold without introducing optical distortions, and basic materials and equipment were expensive. Given the difficulties in this replication method, improvements and innovations in the process followed. Experience has shown that birefringence is usually worst on outer disc circumferences and can be minimized with high melt temperature, rapid injection into the mold, low mold pressure, and short mold time. Low-viscosity polycarbonate is also helpful. In addition, a high chlorine content must be avoided, as this correlates with higher error rates in aging tests.

In addition to birefringence, other leading defects include bubbles and white or black spots. The overall yield rates that can be achieved with the foregoing types of defects can range from 90 to 95 percent. However, with defect levels of 5 to 10 percent, there are great economic advantages to be achieved with even minor improvements because of the enormous product volumes in this industry.

After leaving the molding machine, the disc is wholly formed but transparent; a player's laser beam could not read the impressed data because there would be no reflected beam to convey the information. Hence, the reflective layer must be placed over the data pits. The reflective layer, typically aluminum, is very thin on the order of 50 to 100 nanometers thick. To protect this thin layer from physical damage and oxidation, an acrylic plastic layer is applied over it.

The reflection coefficient of the metal layer, including the polycarbonate substrate (note that the CD player laser must shine through the substrate to the metal layer), is specified to be between 70 and 90 percent. In addition, the metal must be chosen to be inert with the polycarbonate substrate. Three cost-effective metals qualify with the required reflectivity and stability: aluminum, copper, and silver. Gold could also be used as an expensive alternative. The fact that it is an inert metal may be of use in some applications. Reflectance values of 80 to 90 percent apply at the readout wavelength even with thin layers. Because of the physical appearance of the layer, aluminum and silver are preferred over copper. Metallization requires a clean room of Class 1,000.

With vacuum evaporation (vapor deposition) as the application method, aluminum has good adherence and is mostly commonly used. A spacer covers the center of the disc, and a ring masks the outer edge. Consequently, only the area containing the information is coated. In some systems, the evaporation is accomplished in a vacuum chamber with aluminum-coated resistance elements. Large racks of discs are treated simultaneously, and a good mirror coating results. Metallization may take about 15 minutes, depending on the size of the vacuum chamber. However, a major production snag is encountered as the discs must be individually loaded onto the racks and batch-metallized. Then the pumping-down of the evaporation chamber must occur, followed by the readmission of air after deposition. These steps are not easily integrated into the otherwise continuous disc manufacturing process. Furthermore, any dust in the chamber, stirred up during pumping, may cause pinholes in the metal layer. This can be avoided only through stringent cleanliness.

Alternatively, some vapor deposition systems employ multiple prechambers in which a spindle loaded with discs may be undergoing metallization while another load in a prechamber is being evacuated. Discs are metallized individually, a process which takes about 3 seconds. With a capacity of 1,200 discs per hour and a target life of 40,000 hours, such a metallizer could run 40 hours without interruption. In still other systems, discs are moved one at a time through the metallizer on a conveyer. In this way, throughput is further increased.

Magnetron sputtering is another metallization method used for CDs. A cold solid target is bombarded with ions, releasing metal molecules which coat the disc. Using high voltages, a discharge is formed between a cathode target and an anode. Powerful permanent magnets behind the cathode form a concentrated plasma discharge immediately above the target area. Argon ions are extracted from the plasma. They bombard the target surface, thus sputtering it. The CD is placed opposite the target and outside the plasma region.

Discs can be metallized one at a time by loading them into a fast pumpdown vacuum chamber; metallization takes only a few seconds. Because each disc sees exactly the same conditions each time (versus different disc-to-disc conditions in a batch process), consistency is enhanced. Alternatively, a continuous sputtering machine with a permanent vacuum can be used for mass production. Discs are loaded at one end of a conveyer and passed through a series of bulkheads which create pressure gradients from ambient pressure down to a vacuum and back again to ambient pressure conditions. Sputtering is faster than evaporation and allows a choice of different metals or alloys. A throughput of 2,400 discs per hour is possible.

A metallic mirror can also be obtained by electroless silver deposition, often called wet silvering, a process long used to produce glass mirrors. In this process wet chemicals are combined to cause the formation of a thin layer of silver over the disc surface. Since the process is accomplished by spraying liquids, a continuous production machine can be used; the discs are placed on a conveyer belt and ride through the sequential processing stages. Wet silvering takes less time per disc than vacuum evaporation, and continuous rinsing of the disc minimizes the formation of pinholes.

The metal layer is covered by a plastic layer with a spin coating machine. This layer protects the reflective layer from scratches and oxidation. The plastic layer can be nitrocellulose-based with air-drying or an acrylic plastic cured in ultraviolet light. The latter is advantageous because of very short curing time, good bonding ability to aluminum, and the fact that it is a harder more scratch-resistance surface. However, it is more costly and difficult to print on.

At the spin coating machine, a small, metered amount of acrylic is sprayed on the disc just inside the inner diameter of the metal coat. The disc is then spun at high speed so that a very thin coat of lacquer, typically about 6 or 7 microns thick, remains over the disc surface. The layer is then cured.

DETAILED DESCRIPTION

This invention relates generally to injection molding apparatus and particularly to a molding architecture that includes a hot sprue bushing and specially configured tip for controlling the temperature of plasticized material from the injector nozzle, through the mold plates, and beyond to the cavity gate for a compact disc. The combination of the hot sprue delivery system, its tip design, and the mold carrying the compact disc cavity operate to reduce the foregoing defect levels, especially the incidence of birefringence and white and dark spots. It is believed that the thermal control and flow control achievable with the invention is responsible for reductions in shear stress and material degradation which is implicated in the creation of such defects.

Figure 3:
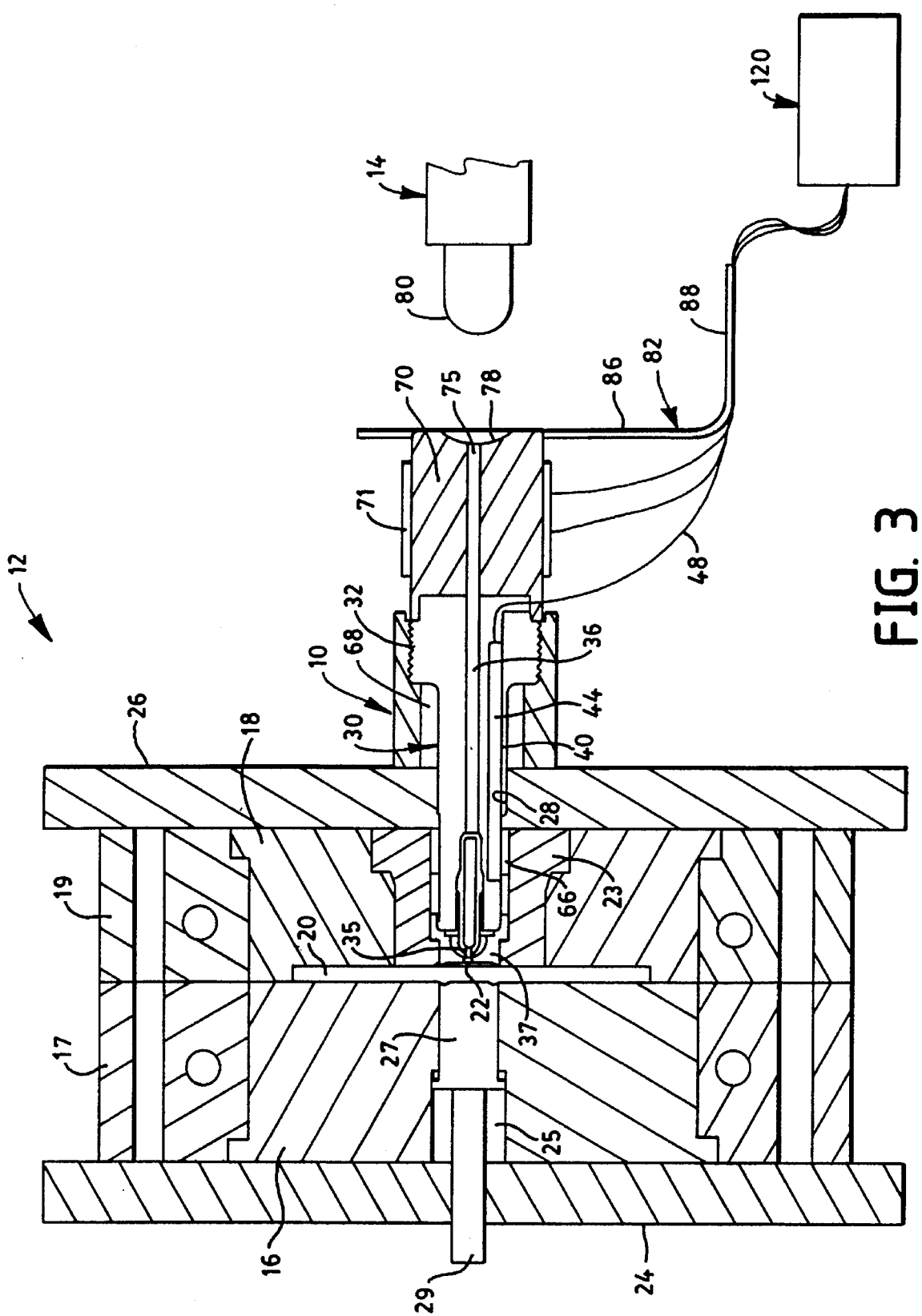
FIG. 3 is a diagrammatic cross-sectional view of the inventive injection molding system for molding a compact disc showing in combination a hot sprue bushing along with other components comprising a center-gated injection mold.

Referring now to FIG. 3, there is shown a molding system 12 for the injection molding of compact discs or similar objects of like surface area to thickness ratios. System 12 includes a hot sprue bushing, designated at 10. Bushing 10 is shown is shown in operative relationship molding system 12, which is a center-gated injection mold. Also shown is a portion of a nozzle 14 from the front end of, for example, a reciprocating screw injection cylinder (not shown) in which either thermoplastic or thermoset materials are plasticized for travel through its orifice into sprue bushing 10 when both are in operative contact with one another. In the case of compact disc fabrication, compact disc grade polycarbonate would be plasticized for travel to the mold system 12.

Mold system 12 comprises a force block 16 and cavity block 18 which between them form a cavity 20 in the shape of a compact disc to be molded. The compact disc may be of conventional size with an outer diameter of 120 mm, a center fore of 15 mm, and a thickness of 1.2 mm. However, other sizes are possible—either large or smaller, e.g., micro discs, which are becoming more popular for downsized audio, video, and computer playback devices. Entrance to cavity 20, whose surface carries the encoded pits provided in a well-known manner, is by way of an orifice 22 commonly referred to as the cavity gate.

Force block 16 is fixedly mounted to a back-up mold mounting plate 24 via a retainer plate 17, and cavity block 18 to a cavity retainer or stationary plate 26 via a retainer plate 19. A gate insert 23 is provided in cavity block 18 and includes in a well-known manner ports, passages, and "O"-rings for carrying water for cooling cavity 20 and air for aid in ejecting a compact disc after it is formed and the mold is opened.

Force block 16 includes a bore hole 25 in which resides a punch 27 that is selectively actuated by a hydraulically driven ram 29 extending through plate 24. Punch 27 preferably is operated during the molding cycle so that it cores out the center hole of a compact disk before it is hardened and still is in a semi-molten state.

During the injection molding process, plates 24 and 26 are physically held in place against one another by clamping as with, for example, well-known hydraulically powered clamping arrangements (not shown) and, in turn, retain the cavity defining halves of mold 12 together under the injection pressure. Once the plasticized material solidifies, plate 24 is customarily moved to break the mold at parting line 21, and the part is either removed or ejected. Plate 26 usually remains stationary during this process and hence may be referred to as a stationary plate. It may also be called a top clamping plate, and its thickness has been standardized by industry practice where different thicknesses have been adopted to match different loadings generated while injecting parts of different size and projected area.

Connecting the cavity gate 22 and the orifice of nozzle 14 is an inventive hot sprue bushing 10 which can be adjusted in the manner to be described for use with either standard stationary plate thickness, stationary plates of custom thickness, or other custom lengths while also controlling temperature of the plasticized material traveling through it. Hot sprue bushing 10 fits through either a standard three-quarter or one inch diameter hole 28 through stationary plate 26 for this purpose.

Figure 4:
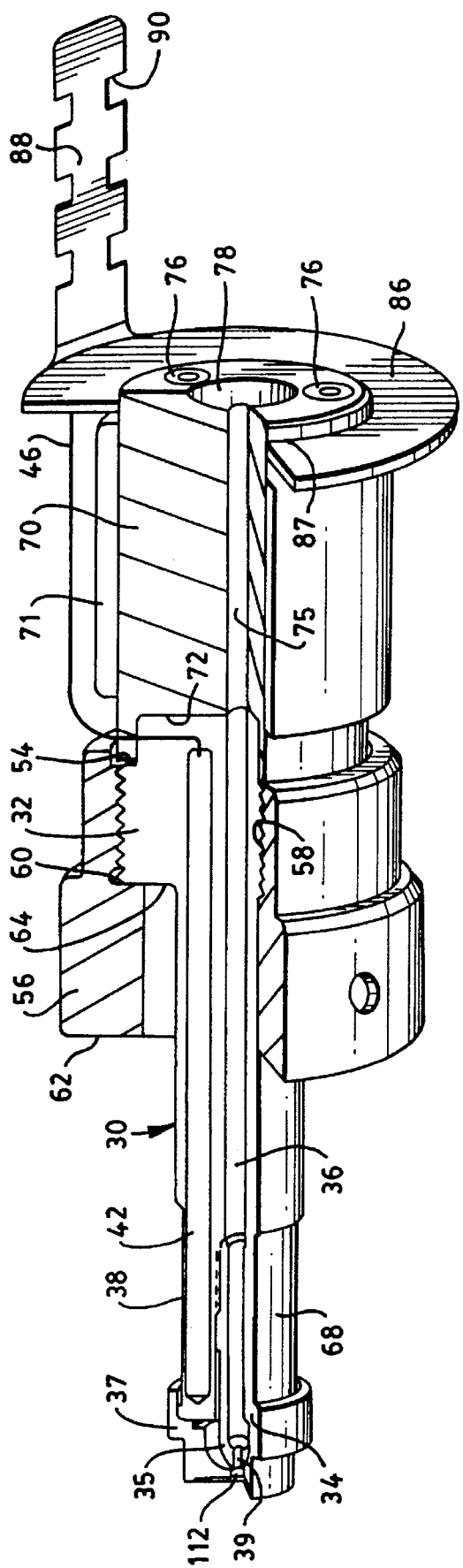
FIG. 4 is an enlarged, diagrammatic perspective view of a hot sprue bushing of the invention shown with parts cut away.

Referring now to FIG. 4, hot sprue bushing 10 can be seen to comprise a body 30 made of a single piece of corrosion resistant steel that is preferably hardened to the same level of stationary plates and mold halves to enhance its wearing characteristics and improve reliability of operation.

At the nozzle end of body 30 is a threaded, enlarged head 32 with a reference surface 54 while opposite it, near the mold end, is a distal end 34. Screwed into distal end 34 is a specially configured tip 35, which aids in thermal control, and surrounding tip 35 is an adapter 37 that is configured to provide an interface between tip 35 and compact disc mold cavity 20.

Extending the length of body 30 is an elongated through bore 36. Plasticized material emerging from nozzle 14 is conveyed to cavity gate 22 via bore 36 through tip 35. Included in tip 35 is a an orifice 39 that is a straight through bore that connects with a following tapered hole (as described hereinafter) that extends toward mold 12 to promote easy release of parts. The length of orifice 39 is also relatively short and "freezes" off to prevent flow of plasticized material at the end of a molding cycle as will be explained in more detail hereinafter.

Surrounding bore 36 are four equally spaced holes (one of which is shown at 38) arranged radially at 90-degrees to one another. Holes 38 are dimensioned to extend substantially the length of central bore 36 and receive resistive heating cartridges such as that designated typically at 42. Heating cartridges 42 are placed so that, when powered, they preferably provide uniform heating of central bore 36 along its length to mitigate against adverse processing conditions related to uncontrolled temperature variations. This arrangement comprises a system for delivering heat to a first zone for system 12 nearest the mold cavity 20. A second zone is provided upstream of this zone, near the nozzle end, as will be described further hereinafter.

Figure 5:
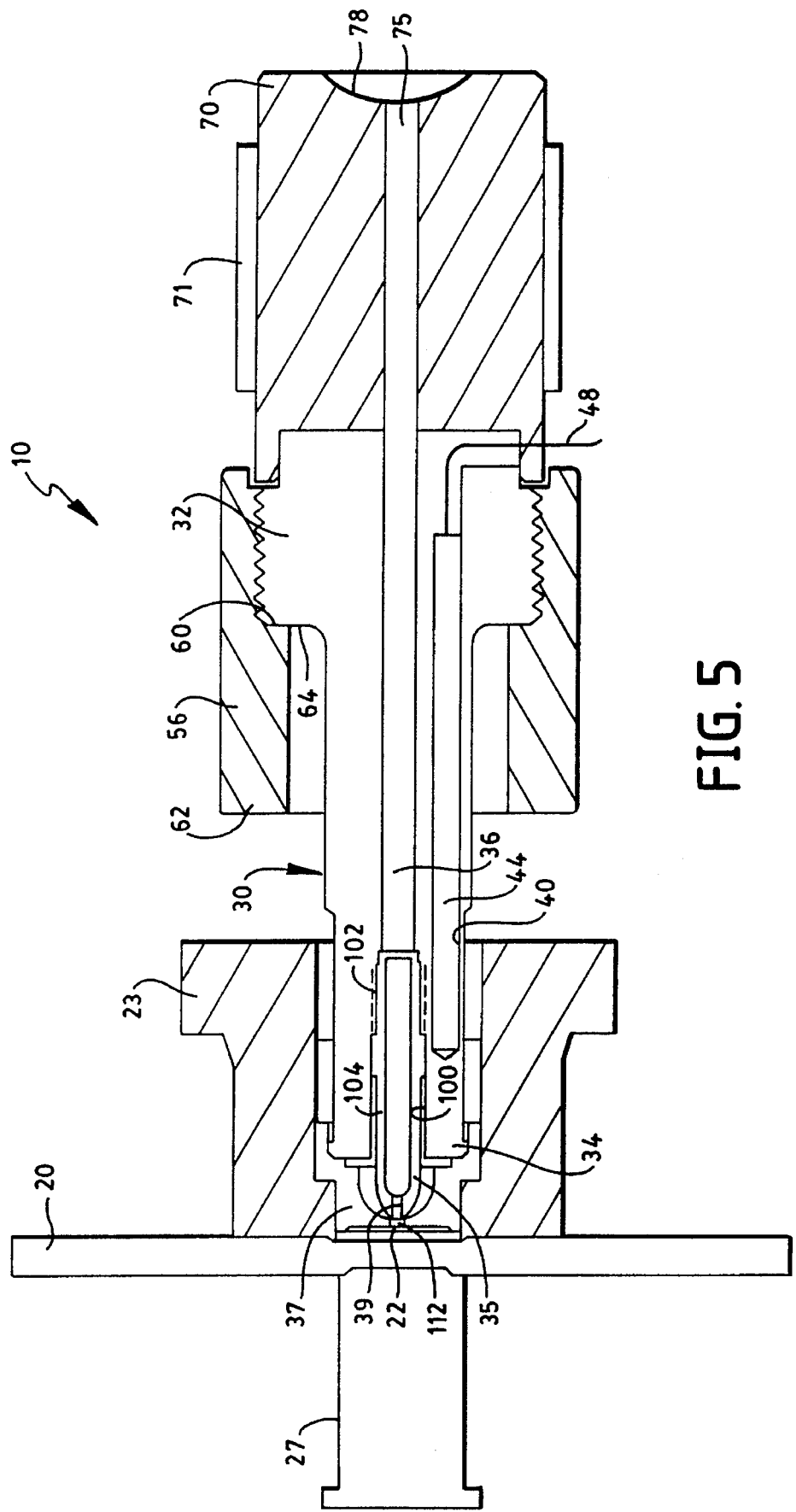
FIG. 5 is an enlarged, diagrammatic, elevational view of portions of the injection molding system of FIG. 3.

To monitor the temperature of bushing 10 in first heating zone, a bore 40 is provided to receive a thermocouple 44 that resides preferably near body tip 34 (See FIGS. 3 and 5). Located at tip 34, this position, nearest the cooling system of mold system 12, is believed to be optimal for temperature sensing because this is the region of body 30 which is most likely to experience the highest heat loss and, therefore, is the monitoring point to assure that all points forward of nozzle 14 in the first zone are sufficiently heated. Locating the temperature sensor at, for example, the nozzle end assures that it only would be at the desired temperature while allowing for the possibility of a cooler tip end, an undesirable situation. In this manner, the tip is held at the desired temperature, even though at the highest point of heat loss, thus reducing the possibility for freeze-off, except as desired in the manner to be described. With tip 35 always at the desired temperature, freeze-off is selectively controlled so that only a small plug is solidified in orifice 39 of tip 35.

Wires from heating cartridges 42, which are designated typically at 46, are led safely out of head 32 via relief slots (not shown). Similarly, wires from thermocouple 44, shown at 48, is led from head 32 via a relief slot (also not shown).

The "drop length" of bushing 10 or, more particularly, the distance from the nozzle side surface of stationary plate 26 to the front surface of body tip 32, where it mates with cavity gate 22 can be adjusted to the needs of a particular molding job through the use of unscrewable sleeves or collars such as that designated at 56. These sleeves 56 are made to different standard lengths and are provided with a front surface 62 and a threaded hole 58 to engage complementary threads on head 32. However, they can also easily be provided inexpensively in custom lengths to match the particular needs of any molding task. When screwed to head 32, a reference surface 60 of sleeves 56 in the bottom of threaded hole 58 mates with bottom surface 64 of head 32, snugly seating against it, to define the drop length.

Sleeves 56 are also preferably made of stainless steel and preferably come in the standard lengths ranging from a shortest of 0.810 inches to a longest of 4.299 inches but, obviously, could be made to any desirable length if non-standard lengths were required. The lengths of sleeves 56 are also set in a well-known manner to account for the thermal coefficient of expansion of the material from which they are fabricated and the expected temperature environment in which they will are to be used.

Consequently, the use of a series of standardized "drop length" sleeves with a single-piece body 30 provides users with a simple means for reducing bushing inventor. This interchangeability also solves the lead time problems encountered while awaiting a bushing delivery not in inventory. Hence, part delivery time is greatly improved.

To prevent heat conduction between the outer surfaces of body 30 and the inner surfaces of stationary plate hole 28 or the surfaces of the cavity block 18 extending from the front surface of plate 26 to cavity gate 22, the diameter of the tip of body 30 is, for a short distance, made slightly larger than that of the remainder of body 30 extending rearwardly to reference surface 64. Thus structured, when bushing 10 is mounted in mold 12, air relief gaps 66 and 68 are formed. Gaps 66 and 68 will vary in length depending on the length of sleeve 56 in use but, in any event, form a gap of nonconducting air around substantially the entire length of body 30, insulating it from the possible heat loss to its otherwise intimate surroundings.

Near the nozzle end of body 30 a heat conducting cap 70 is provided for attachment to head 32. Cap 70 is preferably formed of a material of high heat conductivity, preferably of stainless steel. Surrounding cap 70 is a resistive heating band 71, which in combination with cap 70 defines the second heating zone of bushing 10. The second heating zone is obviously proximate the nozzle end, and hence may be thought of as the nozzle end heating zone.

The method for attaching cap 70 is via three cap screws 76 (only two shown) which enter corresponding holes located in head 32. Cap 70 is provided with a well finished surface 72 which snugly seats against the rear surface of head 32 to create intimate contact with it for purposes of assuring high heat conduction between body 30 and cap 70. In this manner, heating of cap 70 assures that the short orifice through it, indicated at 75, is maintained at or near the same temperature as that of through bore 36.

A spherical recess 78 is provided in the rear end of cap 70 to mate with front end of nozzle 14 designated as 80. Since cap 70 is easily removable, recess 78 can be provided in a number of different geometries to match those of available standard nozzles.

A bracket 82, preferably of stainless, is provided for ease of handling and to hold and position wiring away from surrounding molding equipment. Bracket 82, which is made of thin sheet stock, has a circular section 86 provided with stamped out hole 87. At ninety degrees to section 86 is a rearwardly extending arm 88 having a series of notches typically shown at 90 for the purpose of securing wiring. Bracket 82 bolts to head 32 via screws 76, and nozzle 14 gains access to recess 78 via hole 87.

Figure 6:
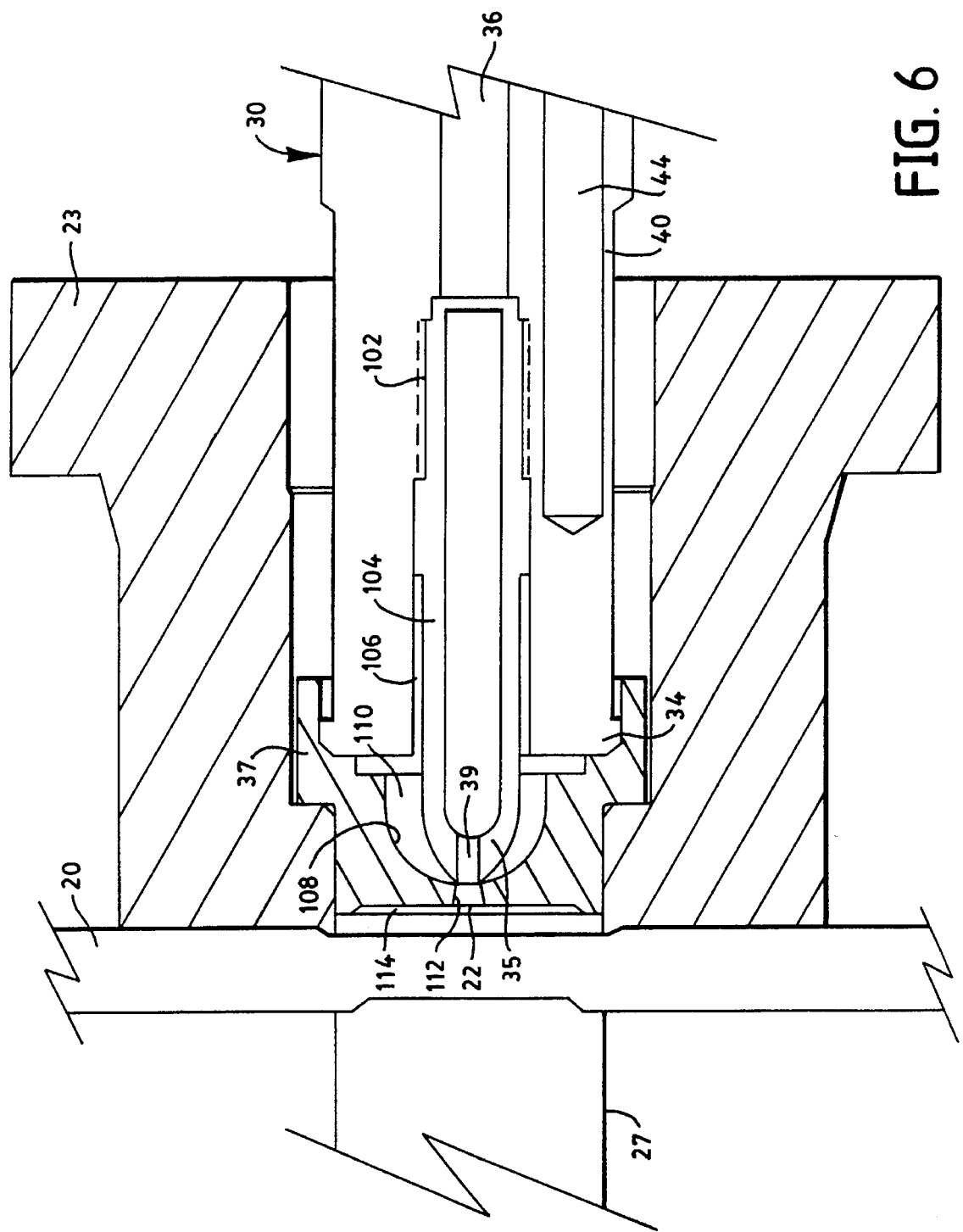
FIG. 6 is an enlarged, diagrammatic, cross-sectional view of a portion of the tip of the hot sprue bushing of FIGS. 4 and 5 shown in combination with components of the injection molding system of FIG. 1.

As best seen in FIG. 6, tip 35 screws into a bore 100 located in the distal end of body 30. Tip 35 comprises a threaded head 102, a neck 104, which is reduced in diameter compared with the internal diameter of bore 100 to provide an air gap 106 between them. Orifice 39 is the single orifice that communicates with the disc mold gate via adapter 37.

Tip 35 is preferably made of a material having high heat conducting properties such as beryllium copper of a like material. In addition, tip 35 is provided with several coatings of wear and abrasion resistant plating to enhance its reliability and useful life. Because threaded to body 30, tip 35 may easily be replaced in the field. Being fabricated of a material with a high heat conductivity, tip 35 has a thermal mass less than that of the material of body 30 and a coefficient of thermal conductivity substantially higher than that of elongated body 30 so that elongated body 30 can act as a constant temperature source with respect to tip 35 so as to transfer heat to tip 35 at the portion thereof in thermal contact therewith to heat tip 35.

Adapter 37 provides an interface between tip 35 and disc mold cavity 20. As can be seen best in FIG. 6, adapter 37 has a stepped diameter which serves to locate it longitudinally and transversely in gate insert 23 so the it is properly aligned with respect to the flow path.

As seen, adapter 37 has a tapered orifice 112 which leads into a generally hemispherical chamber 108. The tapered forward end of tip 35 resides inside of this chamber 108 with it orifice 39 in communication with orifice 112. Between the inside surface of chamber 108 and the outside surface of the forward end of tip 35 is formed a tapered space 110 whose shape is selectively designed to control the rate at which heat is selectively lost to the surrounding proximate areas of the mold that are cooler than the flow path.

Figure 7:
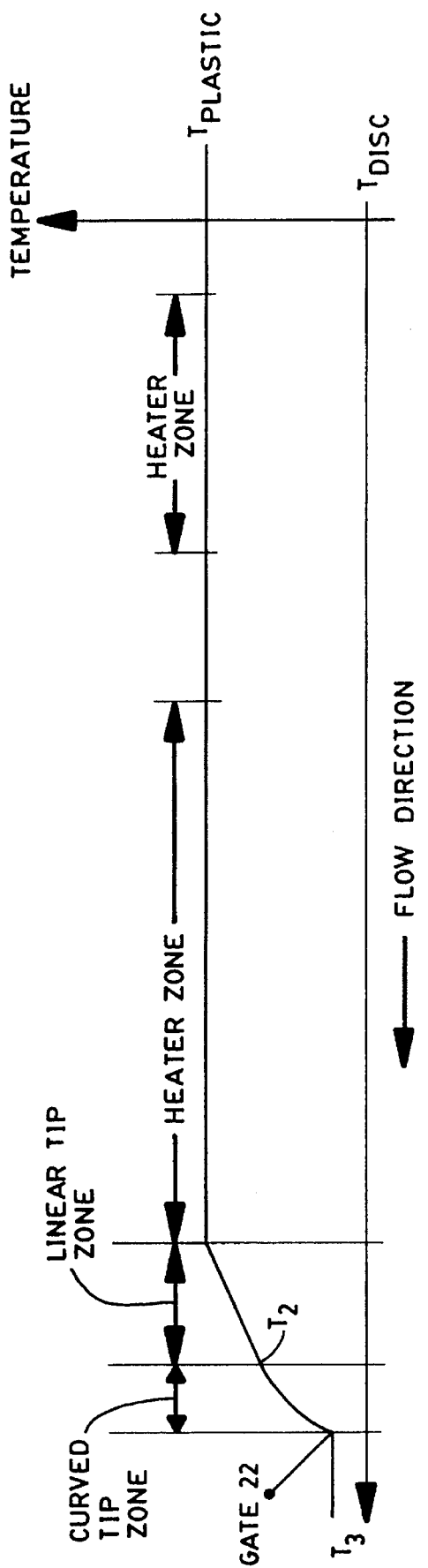
FIG. 7 is a diagrammatic graph showing the nominal temperature of resin as it flows through the hot sprue bushing of the invention to the gate of the compact disc mold cavity.

With this arrangement, molten polycarbonate initially fills the space between tip 35 and adapter 37 and body 30 to provide a volume of insulating plastic whose thickness varies in a preferred manner to control heat losses to the surround. As shown in FIG. 7., temperature is controlled to be uniform over the two heated zones. Heat is transferred from the distal end of body 30 through threads 102 of tip 35. In this area, the temperature gradually tapers off in a more or less linear fashion. Beyond this in the curved tip zone, the temperature falls off more rapidly to the gate temperature. By careful control of the tip shape with the adapter shape, the temperature at the gate can be precisely controlled to reach a temperature, $T_3$, which for convenience can thought of as the plastic-freeze temperature, i.e., the temperature at which the initially molten plastic begins to freeze off.

In the foregoing manner the tip 35, elongated body 30, and molding blocks are configured and arranged with respect to one another so that the temperature of tip 35 gradually reduces to a level at which plasticized material just freezes at the gate to mold cavity 20.

The temperature profile of FIG. 3 is preferably established by running the mold for several shots while monitoring and adjusting temperature until temperature $T_3$ is reached. As a general guideline, the plasticized material runs about 550° F. and the disc temperature is about 160° F. When $T_3$ occurs, a small plug freezes in orifice 112 and in a subsequent shot is pushed into cavity 20 where it again becomes molten. Hence, there are no residual cold sprues to contend with as in the usual more conventional cold sprue molding architectures.

At the appropriate time during the molding cycle, punch 27 moves into a disc to punch out its center hole, and the material from this operation forms in a relief area 114 provided in adapter 37. After the shot, this material is discarded.

Temperature feedback control for both heating zones is provided via a well-known system designated at 120 in FIG. 1.

Those skilled in the art may make changes to the invention without departing from the scope of its teachings. For example, the function of adapter 37 may be provided by directly machining of cavity block 18 or gate insert 23. However, adapter 37 is preferred since it is a more economical approach. In addition, it is common practice such molds to "coin " a compact disc by the addition of a supplementary compression step in the molding cycle, and this practice is well within the scope of the invention. Therefore, it is intended that the embodiments described above be considered as illustrative and not be construed in a limiting sense.

What I claim is:

1. An injection molding system for fabricating thin, flat compact discs, said injection molding system comprising:
    a pair of molding plates relatively moveable with respect to one another, one of said pair of molding plates being stationary and one moveable with respect to said stationary one;
    a pair of molding blocks carried on said pair of said molding plates, at least one of said pair of said molding blocks being adapted to form a molding cavity for the compact discs, said pair of said molding plates and said pair of said molding blocks adapted to be moved between a closed position in which said molding cavity is closed for forming the compact discs and an open position in which the compact discs may be removed from said molding cavity, one of said molding blocks being carried on said moveable molding plate and one being fixedly mounted to said stationary molding plate;

a heatable sprue bushing for use in transporting plasticized material from an injection nozzle to the edge of the mold cavity while controlling the temperature of the plasticized material, said heatable sprue bushing comprising:

an elongated body of given length having arranged in order along its length a head, a stem, and a distal end, said head having a reference seating surface which faces said distal end and a rear surface facing opposite said distal end, said elongated body having a through bore passing from end to end through said head, stem, and distal end thereof for transporting plasticized material through at least a portion of said elongated body from said head toward said distal end thereof, said elongated body having at least one nonthrough bore extending alongside said through bore, in heat conducting relationship with respect thereto, and adapted to receive an electrically powered heating cartridge for controlling the temperature of plasticized material as it travels along said through bore, said nonthrough bore having a length which extends from said head rear surface, through said head and said stem and into said distal end by a predetermined distance, said length of said nonthrough bore being shorter than said given length of said elongated body, said through bore being counter bored a given depth near said distal end of said elongated body, said body being fabricated of a material with a predetermined heat capacity and coefficient of thermal conductivity to provide it with a predetermined mass and heat transfer capability, a predetermined length of said elongated body extending through said stationary molding plate and said block fixedly attached thereto; and a tip fitted into said counterbore of said elongated body so that part of said tip is in heat conducting relationship with respect to said elongated body while its remaining parts are thermally isolated therefrom, said tip being releasably mateable with said elongated body, having a single flow bore which is adapted to communicate with said through bore of said elongated body to receive plasticized material from it, and a curved forward end, said tip including a single flow channel of predetermined length that communicates with the gate of the cavity mold, said tip being fabricated of a material that has a thermal mass less than that of said body material and a coefficient of thermal conductivity substantially higher than that of said elongated body material so that said elongated body acts as a constant temperature source with respect to said tip so as to transfer heat to said tip at said portion thereof in thermal contact therewith to heat said tip, said predetermined length of said flow channel of said tip, said curved forward end of said tip, and said molding blocks being configured and arranged with respect to one another so that the temperature of said curved forward end of said tip gradually reduces to a level at which plasticized material just freezes at the gate to mold cavity at the end of a molding cycle before the beginning of a subsequent molding cycle.

2. The injection molding system of claim 1 wherein said heatable sprue bushing further includes a head attached to the nozzle end of said elongated body, said head being outside of said pair of said molding plates and said molding blocks and including a through bore to provide a flow path between said elongated body and a nozzle, said head being surrounded by a heating band for further control of temperature of plasticized material.

3. The molding system of claim 1 further including an adapter to interface with the gate of the molding cavity and said tip.

4. The molding system of claim 3 wherein said adapter and said tip are selectively shaped with respect to one another and said molding blocks to gradually reduce the temperature of plasticized material from its temperature in said flow channel to the freezing temperature at the mold cavity gate.

5. The molding system of claim 1 wherein said tip material comprises beryllium copper.

6. The molding system of claim 1 wherein said tip and said body each have complementary threaded portions so that said tip can easily be exchanged for another for purposes of at least one of repair, maintenance, and tip configuration changes.

7. The molding system of claim 1 wherein said sprue bushing further includes adjustment means manually positionable against said reference seating surface of said head, between said reference seating surface and said distal end for setting the drop length of said sprue bushing, said adjustment means being adapted to provide a mold plate seating surface selectively locatable over a predetermined range of distances between said reference seating surface and said tip to adjust the drop length of said hot sprue bushing, the drop length corresponding to the distance between said mold plate seating surface and said distal end.

8. The molding system of claim 7 wherein said adjustment means comprise a series of interchangeable spacing sleeves of different length for separate use with said elongated body.

9. The molding system of claim 1 wherein said sprue bushing at least one nonthrough bore comprises four bores for receiving four heating cartridges, said four bores being equally spaced around said through bore of said elongated body.

10. The molding system of claim 1 wherein said sprue bushing further comprises yet another bore adapted to receive and position a temperature sensor substantially at said distal end of said elongated body for controlling the temperature of said through bore over its full given length.

11. The injection molding system of claim 1 wherein said stationary molding block further includes an adaptor fixably mounted in said stationary molding block and including chamber defining means and said forward end of said tip is further configured and arranged with respect to said chamber defining means to provide a tapered space between the outside surface of the distal end of said forward end of said tip and the inside surface of a portion of said stationary molding block chamber defining means, said tapered space having a shape for selectively controlling the rate at which heat is selectively lost to the surrounding proximate areas of said molding blocks and said molding plates to assure that plasticized material freezes proximate the gate of said molding cavity when a molding cycle ends.

* * * * *